US009789652B2

(12) United States Patent  
Armstrong

(10) Patent No.: US 9,789,652 B2  
(45) Date of Patent: Oct. 17, 2017

(54) MANUFACTURING SYSTEM USING TOPOLOGY OPTIMIZATION DESIGN SOFTWARE, NOVEL THREE-DIMENSIONAL PRINTING MECHANISMS AND STRUCTURAL COMPOSITE MATERIALS

(71) Applicant: FREESPACE COMPOSITES INC., Calgary (CA)

(72) Inventor: Nathan Armstrong, Calgary (CA)

(73) Assignee: Nathan Armstrong, Calgary (CA)

( * ) Notice: Subject to any disclaimer, the term of this patent is extended or adjusted under 35 U.S.C. 154(b) by 414 days.

(21) Appl. No.: 14/632,975

(22) Filed: Feb. 26, 2015

(65) Prior Publication Data

US 2015/0239178 A1    Aug. 27, 2015

Related U.S. Application Data

(60) Provisional application No. 61/945,025, filed on Feb. 26, 2014.

(51) Int. Cl.
*B29C 67/00* (2017.01)
*B33Y 40/00* (2015.01)
(Continued)

(52) U.S. Cl.
CPC ......... *B29C 67/0092* (2013.01); *B25J 9/1679* (2013.01); *B29C 67/0088* (2013.01); *B33Y 10/00* (2014.12); *B33Y 30/00* (2014.12); *B33Y 40/00* (2014.12); *G05B 19/4099* (2013.01); *G06F 17/509* (2013.01); *G06F 17/5086* (2013.01); *B33Y 50/02* (2014.12);
(Continued)

(58) Field of Classification Search
CPC ............ B29C 67/0051; B29C 67/0055; B29C 67/0085; B29C 67/0088; B29C 67/0092; B33Y 10/00; B33Y 30/00; B33Y 40/00; B33Y 50/00; B33Y 50/02; G05B 19/4099; G05B 2219/35134; G05B 2219/49007; G06F 17/50; G06F 17/5086; B41F 15/0872
See application file for complete search history.

(56) References Cited

U.S. PATENT DOCUMENTS 5,059,266 A    10/1991 Yamane et al.
5,121,329 A     6/1992 Crump
(Continued)

FOREIGN PATENT DOCUMENTS

CN         101259798 A    10/2010
WO    WO 2013/163585 A1    10/2013

OTHER PUBLICATIONS http://www.roadandtrack.com/racing/race-technology/go-printcut?src=rss; Jun. 30, 2014.
(Continued)

*Primary Examiner* — Crystal J Barnes-Bullock
(74) *Attorney, Agent, or Firm* — Bennett Jones LLP

(57) ABSTRACT

The invention disclosed herein integrates several technological concepts: novel three-dimensional accretive manufacturing mechanisms and processes; combinations of fiber materials with plastics, typically thermoplastics, in accretive manufacturing (three-dimensional printing, for example); position-awareness for manufacturing control systems; and computer-aided design optimization processes with novel feedbacks.

62 Claims, 1 Drawing Sheet

(51) Int. Cl.
  *B33Y 10/00* (2015.01)
  *G06F 17/50* (2006.01)
  *B33Y 30/00* (2015.01)
  *B25J 9/16* (2006.01)
  *G05B 19/4099* (2006.01)
  *B33Y 50/02* (2015.01)

(52) U.S. Cl.
  CPC .............. *G05B 2219/49007* (2013.01); *G05B 2219/49023* (2013.01); *G06F 2217/08* (2013.01)

(56) References Cited

U.S. PATENT DOCUMENTS

| | | | |
|---|---|---|---|
| 5,718,951 A | 2/1998 | Sterett et al. | |
| 5,936,861 A | 8/1999 | Jang et al. | |
| 6,129,872 A | 10/2000 | Jang | |
| 6,165,406 A | 12/2000 | Jang et al. | |
| 6,280,484 B1 | 8/2001 | Kelder et al. | |
| 6,629,011 B1 | 9/2003 | Calderon et al. | |
| 7,389,154 B2 | 6/2008 | Hunter et al. | |
| 8,282,380 B2 | 10/2012 | Pax et al. | |
| 8,778,252 B2* | 7/2014 | Mackie | B29C 67/0055 264/308 |
| 8,877,438 B2* | 11/2014 | Yin | B82Y 30/00 435/6.1 |
| 9,183,325 B2* | 11/2015 | Wighton | B29C 67/0092 |
| 9,481,131 B2* | 11/2016 | Yerazunis | B29C 67/0055 |
| 9,505,173 B2* | 11/2016 | Maggiore | B29C 67/0051 |
| 9,579,851 B2* | 2/2017 | Mark | B29C 67/0088 |
| 2002/0129485 A1 | 9/2002 | Mok et al. | |
| 2006/0111807 A1 | 5/2006 | Gothait et al. | |
| 2012/0251688 A1 | 10/2012 | Zimmerman et al. | |
| 2012/0295075 A1 | 11/2012 | Yasukochi | |
| 2013/0000549 A1 | 1/2013 | Hartmann | |
| 2013/0108726 A1 | 5/2013 | Uckelmann et al. | |
| 2013/0209600 A1 | 8/2013 | Tow | |
| 2014/0252668 A1* | 9/2014 | Austin | B28B 3/20 264/40.7 |
| 2014/0363532 A1* | 12/2014 | Wolfgram | B29C 67/0085 425/113 |
| 2015/0224712 A1* | 8/2015 | Tjellesen | B29C 67/0077 425/375 |
| 2016/0318130 A1* | 11/2016 | Stempfer | B23K 26/1429 |

OTHER PUBLICATIONS http://arstechnica.com/science/2015/02/the-wild-weird-world-of-carbon-fiber/?utm_source=feedburner&utm_medium=feed&utm_campaign=Feed%3A+arstechnica%2Findex+%28Ars+Technica+-+All+content%29; Feb. 23, 2015.

\* cited by examiner

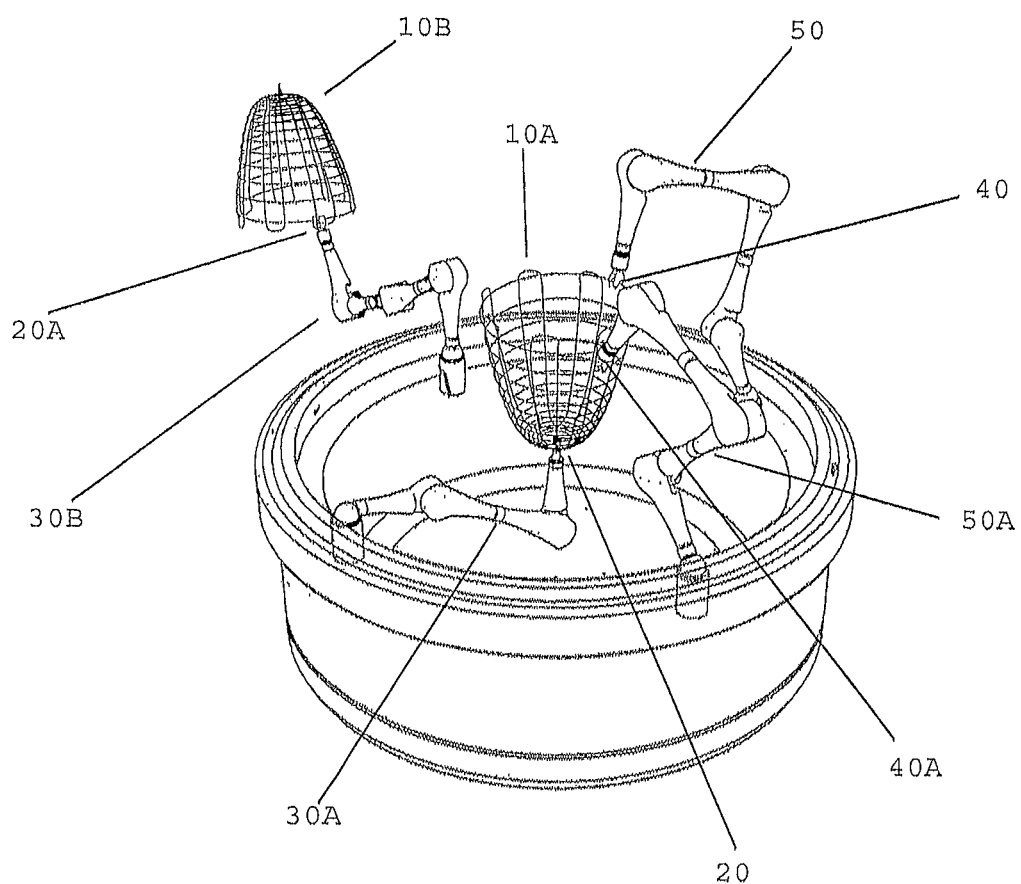

MANUFACTURING SYSTEM USING TOPOLOGY OPTIMIZATION DESIGN SOFTWARE, NOVEL THREE-DIMENSIONAL PRINTING MECHANISMS AND STRUCTURAL COMPOSITE MATERIALS

FIELD OF THE INVENTION

This invention integrates at least several of the following technological concepts: novel three-dimensional accretive manufacturing mechanisms and processes; combinations of fibre materials with plastics, typically thermoplastics, in accretive manufacturing (three-dimensional printing, for example); position-awareness for manufacturing control systems; and computer-aided design optimization processes with novel feedbacks.

BACKGROUND OF THE INVENTION

It is known that computers may control machine processes in manufacturing of components or discrete items, and typical examples in the prior art include things like numeric-controlled milling machines which are used for operations such as milling custom-designed automotive wheels from block or bar stock metal materials. These techniques essentially are subtractive manufacturing, as material is removed from a starting material to achieve a desired form. Typical restrictions have to do with the limitations on access by computer controlled machining acting surfaces (bits, grinders, burners, lasers, etc) to the working surfaces of the desired part, as well as some restrictions on the types of materials which can be machined, and thus the types of substances from which parts can be manufactured by substractive working.

More recently, computer control systems have been adopted to perform additive manufacturing, most commonly thought of as "3D Printing" processes, but which can also include printing with fine extrusions of thermoplastics or deposition of metals for manufacturing of processes like jewelry, turbine blades, sculpture and toys, and rougher (broader gauge) extrusions or depositions of materials such as concrete/cement or similar materials for gross manufacturing of things like buildings. Other techniques include things like photo-hardening plastics built in accretive layers by exposure of a photo-sensitive liquid to effective light frequencies and successive submersions with further exposures, to form 'stacked layers' of two-dimensional shapes to form three-dimensional objects. These additive manufacturing systems are somewhat limited, again by things like the ability to build a part or component from layers of accreted printed material, the ability to control movement of printheads or light exposure sources and the substrates already laid down, the types of materials suitable for use in fine-detail printing or lithography settings, and the like. Additional constraints have to do with ensuring location of print-head or lithography activity in space, typically by tightly constraining the base and initial (and as-building) part or component from any movement.

Computer assisted design systems are maturing, and have been used to assist human designers by providing tool-kits to calculate stress loads, strain loads, electrical, magnetic or optical characteristics/performance, weight and balance, and similar background operations, in order to streamline the designer's task, which could include, for example, creating a shaped object for a purpose (such as a sculpturally elegant swing-arm for a motorcycle's suspension system, which would require aesthetic qualities but also would be required to meet design constraints for fittings or mounting surfaces for assembly to the vehicle, as well as load-bearing, torque-bearing, torsional loading, weight-balance and other characteristics). Similar systems are in operation for designing and instructing componentry manufacture and assembly for large structures such as buildings with unconventional shapes and skins (such as relatively recent Frank Gehry designs). Computer-assisted design systems are not mature and operational in providing design tools to deal with three-dimensional composite components which can be manufactured using non-obvious accretive manufacturing techniques with variable or composite materials, in particular such as are described below.

SUMMARY OF THE INVENTION

The present invention comprises several inter-related subcomponents including:

A novel apparatus and process for accretive three-dimensional manufacturing which improves upon typical two-dimensional to three-dimensional or fixed-platform component manufacturing systems in the prior art;

Novel composites for three-dimensional accretive extrusion or similar manufacturing systems which include variable fibre inclusion in thermo-set or similarly extrudable or formable substrate materials;

Novel extensions of computer-aided design systems which accommodate shape and other optimization routines and libraries which can assist designers; and Novel feedback systems between: optical and other sensors for spatial location of the work piece and elements of the manufacturing apparatus; sensors for status, control and other characteristics of the manufacturing apparatus itself; and control software for instructing the manufacturing apparatus to perform the designed material deposition which monitor the manufacturing process in real-time or near real-time and adjust the operational behavior of the manufacturing system to accomplish the design goals of its instructions.

One embodiment of the present invention is an apparatus for making a three dimensional object, comprising:
 a. a stage for supporting the object during operation, on which the object is made, to which the object may be attached or grasped during operation;
 b. articulable positioning means adapted for engagement with the stage, the positioning means operative for holding and manipulating the location and orientation of the stage and object thereon in three-dimensional space during manufacture of the object;
 c. deposition means having at one end a discharge outlet operative for releasing and laying material for forming the object onto the stage or onto the object during the accretive manufacture of the object;
 d. a material source containing material used to form the object, the material source in fluid flow communication with the deposition means at another end of the deposition means remote from the discharge outlet;
 e. articulable positioning means adapted for engagement with the deposition means, the positioning means operative for holding and manipulating the deposition means in three-dimensional space for controlling where the material is laid;
 f. sensing means for sensing the location and orientation of one or more of the stage, the articulable positioning means for the stage, the object surfaces, the deposition means, the articulable positioning means for the deposition means, and the material laid, measured in real time; and g. control systems for controlling one or more of:
   i. location and orientation of the stage, and then the object surfaces during operation;
   ii. location and orientation of the articulable positioning means for the stage and the articulable positioning means for the deposition means; and
   iii. location and orientation of the deposition means and the material laid by the deposition means during operation, including the discharge of material by the deposition means and any subsequent change in the material laid by the deposition means.

The present invention also provides a process for making a three-dimensional object, comprising:

a. providing a deposition means for releasing and laying material for forming the object onto the stage or onto a object during the accretive manufacture of the object;
b. providing an articulable positioning means for holding and manipulating the location and orientation of the stage or the object thereon in three-dimensional space;
c. providing an articulable positioning means for holding and manipulating the location and orientation of the deposition means in three-dimensional space for controlling where the material is laid;
d. sensing the one or more of the location and orientation of the stage, the articulable positioning means for the stage, the object surfaces, the deposition means, the articulable positioning means for the deposition means, and the material laid, measured in realtime; and
e. controlling the location and orientation of: the stage, and then the object surfaces; the articulable positioning means for the stage and the articulable positioning means for the deposition means; the deposition means and the material laid by the deposition means during operation, including the discharge of material by the deposition means; and any subsequent change in the material laid by the deposition means during operation.

BRIEF DESCRIPTION OF THE DRAWINGS

FIG. 1 depicts a line-drawing in perspective of an embodiment of the apparatus of the present invention in operation.

DETAILED DESCRIPTION

Manufacturing System

In an embodiment, the manufacturing system of the present invention comprises an articulable and detachable stage (not shown, but at 20) for the component 10A, 10B being constructed 10A which permits the movement and exact location of the component's surfaces in three-dimensional space and the passing of the control of that location from one set of articulable holder systems 20, 30A to another set of articulable holding systems 20A, 30B. Location information about the component's surface 10A, including location and orientation in three-dimensional space (and time) can be managed using additional sensor information providing real-time measurements to the system's controller subsystems. These can be optical, sonic or ultrasonic, RF interference, or other location awareness or sensing technologies which provide for exact location and orientation measurement informational feedback to the system's operation.

Additionally, the system has at least one means of producing an extrusion of material 40 for placement and hardening to form the manufactured part or component 10A, 10B on the detachable stage (not shown, at 20) in a controlled way. An embodiment might be an extrusion head 40 for extrusion of thermoplastic and co-extrusion of injected fibres (for example carbon-fibre filaments of designed characteristics) at variable but controlled flow rates, extruded filament diameters and lengths, and the like—the extrusion head 40 might be called a "spinneret" at 40, 40A. The spinneret 40 would be supplied with materials and energy as required from external sources through a conduit or conduits, and the spinneret 40, 40A may be manipulated in three-dimensional space by an articulated arm 50, 50A, for instance, to lay down extruded composite material 40 (thermo-set plastic with co-extruded filaments, as an example) onto the stage or onto another part of the surface of the part or component being manufactured 10A, during manufacture. The spinneret 40, 40A could contain buffers for materials and energy which could permit continuous extrusion operations while the spinneret 40, 40A was passed from one articulating positioning arm 50 to a second similar positioning arm 50A, which would permit operations such as weaving to take place, which are not possible in the prior art due to the topological constraints of prior art three-dimensional accretive manufacturing technologies.

Since the operation involves the sensing of exact real-time location of stage and orientation, part and orientation and spinneret(s) and orientation and operation, the system can also sense any changes (whether by design or not) in the location, shape, temperature or otherwise of the materials laid down by the spinneret(s)—for example, sagging of extruded filaments could be sensed, designed for, accommodated, or worked around, or used to modulate materials characteristics or spinneret behaviours (such as temperature, extrusion rate, nozzle characteristics, movement speed, etc) to take advantage of sensed situations during manufacture. In this way, the manufacturing system would interact with the design system's instructions and constraints, and could provide a feedback loop to optimize manufacture during build processes.

Novel Positioning Means

In one embodiment of the present invention, the manufacturing system can utilize novel positioning means, such as articulable robotic arms, which are designed for the purpose of placing a material such as fibre multi-directionally. In an embodiment, the manufacturing system may comprise two design variants of the same arm.

A first arm design may be used for positioning the part as it is being extruded. In an embodiment, the arm may have, for example, five degrees of freedom and further include a rotational joint at the wrist which may be used for rotating the part to perform, for example, filament winding type operations.

A second arm design may be used to extrude the filament and may have, for example, up to nine degrees of freedom to provide maximum flexibility to place the fibre at the highest level of optimisation as defined by the topology optimisation software. The nine degrees of freedom can include traditional rotational actuators along the length of the arm but may also include a section at the tip with multiple directions of manipulation to provide fine control of fibre placement.

In contrast to arms known in the prior art, which are typically be designed to be highly precise and to carry heavy loads, the arms of the present invention may be designed to be lightweight and need not carry heavy loads, as their primary function is the placement of fibre in three-dimensional space. They can be designed for moving quickly and to rapidly change direction, which may mean they should have low mass and actuators that can accelerate and change direction quickly. Such an articulable arm can provide maximum flexibility for achieving highly-optimised fibre placement and achieving high-speed placement of fibre so parts can be manufactured in as short time as is possible.

Novel Composites

The system is conceived to work with non-composite extrudable or similarly formed materials, but in a preferred embodiment will have means to control inclusions introduced into a substrate of formable materials. These inclusions can be: structural fibre such as used in fiberglass, carbon fibre or other similar materials; transmissive fibre such as communications or electrically conductive or optically conductive or designed fibres; materials for sensing such as fibres with characteristics such as reactivity to shape or tension change, temperature or pressure, light or similar energy application, and the like; magnetic or non-magnetic, shielding (electrical, magnetic, RF, optical or other), bulk, colorant, or any other inclusion which would permit advantageous or aesthetic change to the manufactured object or any part (such as to make the surface with a different material or character than the core, etc) which can be designed. Methods of introducing inclusions into a substrate of formable materials can include co-extrusion, mixing or blending, precipitation during processing, coating, wrapping, agglomerating, growing or other means of providing for laying down materials comprised of more than one type of component or matter. It is noted that the concept is not limited to introducing only one type of inclusion, nor need the inclusion be integral to the resulting laid-down material forming the part.

Novel Extension of Computer Aided Design Tools

In accordance with one aspect, the present invention can also include computer-aided design systems which can accommodate shape and other optimization routines and libraries which can assist designers and control manufacture in the design-build of three-dimensional shapes from composite or other materials in an accretive system which may not be constrained by two-dimensional-to-three-dimensional paradigms.

Modified topology optimisation algorithms may be utilized, in one aspect of the present invention. Topology optimisation may traditionally be used in the engineering process to define a structural form early in a design cycle, by first designing, in 3D CAD, a maximum allowable outside rough form (envelope) within which the final product can fit. Loads and general performance parameters may then be inputted with this rough form envelope using tools within the 3D CAD environment. Typically, in a user interface, graphical arrows may be placed at various points on or in the envelope with associated forces (vectored loads) and frequencies and algorithms interpret that input as point or vector loads, resistances, and the like. The material to be deposited can modeled, with stress, load, resistance springiness or resilience and other mechanical, electrical, thermal or other performance characteristics. The topology optimisation algorithms can then provide a material deposition model to parameters of a "best fit" to the design characteristics desired within the "envelope" and with a mathematically determined 'material deposition' candidate model in at least a rough form, depending on the path of the load stress and materials characteristics, and then iterate this cycle (perhaps millions of times), until all viable potential shapes and paths of 'material deposition' have been reviewed and a best fit resulting model is derived, which can then represent an optimized shape for fulfilling the requirements of the initial defined load parameters and envelope.

In one aspect, the present invention can incorporate the steps of using the properties of a proposed extruded fibre-reinforced filament, strip or deposition layer of material, and inputting the properties into a topology optimisation software system (Program 1). A candidate model may be derived comprised of a shape with deposition of fibre-reinforced, for example, materials in spatial relation to the envelope to satisfy one or more load path definitions (or other desired performance characteristics of the final piece). A final result may then be a candidate model for an optimized form with the fibre reinforced material placed to fulfill the requirements of the predefined load and other desired parameters, which resulting material model may then be exported from Program 1 with a goal of using the result to build an instruction set or program, for example, to control an articulable arm and spinneret system to manufacture the part or work piece, perhaps even including weaving. This resulting instruction set or program for the articulable arm and spinneret may be derived by initially taking a result from Program 1 into a second software (Program 2) that compares the placement of the fibre from the topology optimisation software with the physical capabilities of the robotic articulable arm and spinneret system. If the Program 2 software determines that the placement of the fibre is compatible with the capabilities of the articulable arm and spinneret system, then the fibre placement result can be directly translated into code or instructions that can be used to control the manufacturing robotic arms and place the filament material to produce the desired part. If, however, Program 2 determines that the placement of the fibre in the candidate model is not compatible with the physical capabilities of the articulable arm and spinneret system, (or with laws of physics, for instance), Program 2 can request the topology optimisation software (Program 1) to modify its parameters, for example, to lower the optimisation target (for example, from 100% optimised to 95% optimised), and to reiterate the fibre placement result with the new sub-optimal material deposition model. Program 2 may then take the output or sub-optimal result and perform another iteration of fibre placement to physical capabilities comparison to determine if a new, different fibre placement instruction set can utilized for manufacture. If Program 2 is again unable to provide instructions to the part modeled, the cycle can be reiterated at least until a compatible optimisation level for Program 1 is too low to be deemed useful. At that time, the system of Program 1 and 2 may suggest options, such as whether to manufacture the part using multiple pieces to be joined together post-fabrication, to redesign the initial rough form or envelope or load model, or to use a different methodology for manufacturing the targeted part.

If the comparator result from Program 2 shows incompatibility, as another example, then Program 2 may provide a routine to change the ordering of the manufacturing layup instructions, may provide a randomized change to a deposition starting point on the object surface, or may change the deposition model steps (or their order) within the sequence of buildup of the object, or may change the surface upon which a deposition layer is to be made.

Since the manufacturing system is novel in that it is capable of laying down composite materials onto a moveable stage using passable spinnerets while all operations are sensed for location, orientation, change, and other characteristics (such as temperature, radiance, color, etc), feedback from the manufacturing system can also be sent to the design system to permit real-time adjustments to the manufacturing system based, for instance, on actual "built" conditions such as filament sag, change in composite material mix, unexpected temperature or cure rates, uneven distribution of inclusions, etc.

What is claimed is:

1. An apparatus for making a three-dimensional object, comprising:
   a. a stage for supporting the object during operation, on which the object is made, to which the object may be attached or grasped during operation;
   b. articulable positioning means adapted for engagement with the stage, the positioning means operative for holding and manipulating the location and orientation of the stage and object thereon in three-dimensional space during manufacture of the object;
   c. deposition means having at one end a discharge outlet operative for releasing and laying material for forming the object onto the stage or onto the object during the accretive manufacture of the object;
   d. a material source containing material used to form the object, the material source in fluid flow communication with the deposition means at another end of the deposition means remote from the discharge outlet;
   e. articulable positioning means adapted for engagement with the deposition means, the positioning means operative for holding and manipulating the deposition means in three-dimensional space for controlling where the material is laid;
   f. sensing means for sensing the location and orientation of one or more of the stage, the articulable positioning means for the stage, the object surfaces, the deposition means, the articulable positioning means for the deposition means, and the material laid, measured in real time; and
   g. control systems for controlling one or more of:
      i. location and orientation of the stage, and then the object surfaces during operation;
      ii. location and orientation of the articulable positioning means for the stage and the articulable positioning means for the deposition means; and
      iii. location and orientation of the deposition means and the material laid by the deposition means during operation, including the discharge of material by the deposition means and any subsequent change in the material laid by the deposition means.

2. The apparatus of claim 1, wherein the apparatus further includes a platform coupled to the articulable positioning means for the stage and the articulable positioning means for the deposition means.

3. The apparatus of claim 1, wherein the articulable positioning means for the deposition means further comprises flow-passage means therethrough for introducing the material from the source means to the deposition means, the flow-passage means in fluid flow communication with the deposition means at one end and the material source at another end.

4. The apparatus of claim 1, wherein the deposition means comprises a spinneret.

5. The apparatus of claim 1, wherein the material comprises a substrate material selected from the group consisting of adhesives, waxes, thermoplastic materials, thermoset materials, resins, metallic alloys, glasses, ceramics, silicon, and combinations thereof.

6. The apparatus of claim 5, wherein the thermoplastic material is selected from the group consisting of acetal polyoxymethylene, polylactide, polyethylene, polypropylene, ethylene vinyl acetate, polyphenylene ether, ethylene-acrylic acid copolymer, polyether block amide, polyvinylidene fluoride, polyetherketone, polybutylene terephthalate, polyethylene terephthalate, polycyclohexylenemethylene terephthalate, polyphenylene sulfide, polythalamide, polymethylmethacrylate, polysulfones, polyethersulfones, polyphenylsulfones, polyacrylonitrile, poly (acrylonitrile-butadiene-styrene), polyamides, polycondensates of urea-formaldehyde, polystyrene, polyolefin, polyvinyl butyral, polycarbonate, polyvinyl chlorides, polyethylene terephthalate, ethyl cellulose, hydroxyethyl cellulose, hydroxypropyl cellulose, methyl cellulose, cellulose acetate, hydroxypropylmethyl cellulose, hydroxybutylmethyl cellulose, hydroxyethylmethyl cellulose, ethylhydroxyethyl cellulose, cellulose xanthate, and combinations, and copolymers thereof; the resin is selected from the group consisting of maltodextrin, polyvinyl alcohol, sulfonated polyester polymer, sulfonated polystyrene, octylacrylamide/acrylate/butylaminoethyl methacrylate copolymer, acrylates/octylacrylamide copolymer, polyacrylic acid, polyvinyl pyrrolidone, styrenated polyacrylic acid, polyethylene oxide, sodium polyacrylate, sodium polyacrylate copolymer with maleic acid, polyvinyl pyrrolidone copolymer with vinyl acetate, butylated polyvinylpyrrolidone, polyvinyl alcohol-co-vinyl acetate, starch, modified starch, cationic starch, pregelatinized starch, pregelatinized modified starch, pregelatinized cationic starch, and combinations and copolymers thereof; the adhesive is selected from the group consisting of plaster, bentonite, precipitated sodium silicate, amorphous precipitated silica, amorphous precipitated calcium silicate, amorphous precipitated magnesium silicate, amorphous precipitated lithium silicate, salt, portland cement, magnesium phosphate cement, magnesium oxychloride cement, magnesium oxysulfate cement, zinc phosphate cement, zinc oxide-eugenol cement, aluminum hydroxide, magnesium hydroxide, calcium phosphate, sand, dolomite, amorphous precipitated silicates comprising at least two types of ions selected from the group consisting of sodium ions, lithium ions, magnesium ions, and calcium ions, and combinations thereof; and the thermoset material is selected from the group consisting of polyester, polyolefin, epoxy, vinyl ester, alkyl polyester, melamine isocyanurate, polyurethane, polyurea, phenolic resin, phenylene-based resin, isophthalic unsaturated polyester, orthophthalic unsaturated polyester, and combinations thereof.

7. The apparatus of claim 5, wherein the material is a composite material comprised of the substrate material and an inclusion material.

8. The apparatus of claim 7, wherein the inclusion material is selected from the group consisting of: structural fibres, transmissive fibres, sensing materials, magnetic materials, non-magnetic materials, shielding materials, bulking agent, colorants, and combinations thereof.

9. The apparatus of claim 8, wherein the inclusion material is introduced by a method selected from the group consisting of co-extrusion, wrapping, coating, mixing, precipitating, and combinations thereof.

10. The apparatus of claim 1, wherein the deposition means is operable to release the material at variable but controlled flow rates and filament dimensions.

11. The apparatus of claim 1, further comprising a computer-aided design computing system operative for providing instructions to the control systems.

12. The apparatus of claim 11, wherein the instructions are responsive to feedback from the sensing means of the apparatus.

13. The apparatus of claim 1, wherein the articulable positioning means for the stage is adapted for engagement and disengagement with the stage during operation.

14. The apparatus of claim 1, wherein the articulable positioning means for the stage comprises one or more articulated arms.

15. The apparatus of claim 14 adapted to enable a stage coupled to a first articulable positioning means to be passed to a second positioning means, the stage being disengaged from the first positioning means and subsequently engaged with the second positioning means during operation or between operations, for enabling a plurality of different angles for the deposition means to lay material.

16. The apparatus of claim 15 adapted to enable the stage to be successively passed to one or more additional articulable positioning means during operation.

17. The apparatus of claim 1, wherein the apparatus comprises a plurality of stages, each stage coupled to an articulable positioning means.

18. The apparatus of claim 17, further adapted to enable an object supported on a stage to be successively passed to one or more additional stages for enabling a plurality of different angles for the deposition means to lay material.

19. The apparatus of claim 1 wherein the articulable positioning means for the deposition means is adapted for engagement and disengagement from the deposition means during operation.

20. The apparatus of claim 19, wherein the deposition means further comprises a separate energy source for permitting the continuous release of material by the deposition means during disengagement from the articulable positioning means during or between operations.

21. The apparatus of claim 20, wherein the energy source is a battery.

22. The apparatus of claim 19, wherein the deposition means further comprises a chamber to accommodate the material for permitting the continuous release of material by the deposition means, during disengagement from the articulable positioning means during or between operations.

23. The apparatus of claim 19, further adapted for enabling the deposition means to be successively passed to one or more articulable positioning means, the deposition means being disengaged from a first positioning means and subsequently engaged with a subsequent positioning means during operation or between operations of laying material, for enabling weaving, braiding or interweaving of laid down material when in strands, by removing topological constraints imposed by the deposition means when coupled to an articulable positioning means.

24. The apparatus of claim 1, wherein an articulable control means may be operable for either holding and manipulating the object or stage in three-dimensional space, or holding and manipulating a deposition means during operation in three-dimensional space.

25. The apparatus of claim 1, wherein the sensing means is selected from the group consisting of: optical, sonic, ultrasonic, RF interference, alternate location awareness or sensing technologies, and combinations thereof.

26. The apparatus of claim 1, comprising one or more articulated arms for the stage, wherein the one or more articulated arms include a rotational joint operative for rotating the object during filament winding operations.

27. The apparatus of claim 26, wherein the one or more articulated arms are adapted to have up to five degrees of freedom.

28. The apparatus of claim 26, wherein the one or more articulated arms further comprise actuator means for acceleration and changing direction.

29. The apparatus of claim 1, comprising one or more articulated arms for the deposition means, wherein the one or more articulated arms adapted to have up to nine degrees of freedom.

30. The apparatus of claim 29, wherein the one or more articulated arms further comprise actuator means located along the length of the one or more articulated arms.

31. The apparatus of claim 29, wherein the one or more articulated arms further comprise actuator means located proximate to the deposition means, operable for providing multiple directions of manipulation to provide control of material placement.

32. A process for making a three-dimensional object, comprising:
   a. providing a deposition means for releasing and laying material for forming the object onto the stage or onto a object during the accretive manufacture of the object;
   b. providing an articulable positioning means for holding and manipulating the location and orientation of the stage or the object thereon in three-dimensional space;
   c. providing an articulable positioning means for holding and manipulating the location and orientation of the deposition means in three-dimensional space for controlling where the material is laid;
   d. sensing the one or more of the location and orientation of the stage, the articulable positioning means for the stage, the object surfaces, the deposition means, the articulable positioning means for the deposition means, and the material laid, measured in realtime; and
   e. controlling the location and orientation of; the stage, and then the object surfaces; the articulable positioning means for the stage and the articulable positioning means for the deposition means; the deposition means and the material laid by the deposition means during operation, including the discharge of material by the deposition means; and any subsequent change in the material laid by the deposition means during operation.

33. The process of claim 32, wherein the material laid down may be laid as a ribbon, filament, or 3d extruded shape.

34. The process of claim 32, wherein material is introduced from a source means through the articulable positioning means for the deposition means, wherein the articulable positioning means comprises flow-passage means therethrough.

35. The process of claim 32, wherein the deposition means for releasing and laying the material comprises a spinneret.

36. The process of claim 32, wherein the material for forming the object comprises a substrate material selected from the group consisting of adhesives, waxes, thermoplastic materials, thermoset materials, resins, metallic alloys, glasses, ceramics, silicon, and combinations thereof.

37. The process of claim 36, wherein the thermoplastic material is selected from the group consisting of acetal polyoxymethylene, polylactide, polyethylene, polypropylene, ethylene vinyl acetate, polyphenylene ether, ethylene-acrylic acid copolymer, polyether block amide, polyvinylidene fluoride, polyetherketone, polybutylene terephthalate, polyethylene terephthalate, polycyclohexylenemethylene terephthalate, polyphenylene sulfide, polythalamide, polymethylmethacrylate, polysulfones, polyethersulfones, polyphenylsulfones, polyacrylonitrile, poly(acrylonitrile-butadiene-styrene), polyamides, polycondensates of urea-formaldehyde, polystyrene, polyolefin, polyvinyl butyral, polycarbonate, polyvinyl chlorides, polyethylene terephthalate, ethyl cellulose, hydroxyethyl cellulose, hydroxypropyl cellulose, methyl cellulose, cellulose acetate, hydroxypropylmethyl cellulose, hydroxybutylmethyl cellulose, hydroxyethylmethyl cellulose, ethylhydroxyethyl cellulose, cellulose xanthate, and combinations, and copolymers thereof the resin is selected from the group consisting of maltodextrin, polyvinyl alcohol, sulfonated polyester polymer, sulfonated polystyrene, octylacrylamide/acrylate/butylaminoethyl methacrylate copolymer, acrylates/octylacrylamide copolymer, polyacrylic acid, polyvinyl pyrrolidone, styrenated polyacrylic acid, polyethylene oxide, sodium polyacrylate, sodium polyacrylate copolymer with maleic acid, polyvinyl pyrrolidone copolymer with vinyl acetate, butylated polyvinylpyrrolidone, polyvinyl alcohol-co-vinyl acetate, starch, modified starch, cationic starch, pregelatinized starch, pregelatinized modified starch, pregelatinized cationic starch, and combinations and copolymers thereof and the thermoset material is selected from the group consisting of polyester, polyolefin, epoxy, vinyl ester, alkyl polyester, melamine isocyanurate, polyurethane, olyurea, phenolic resin, phenylene-based resin, isophthalic unsaturated polyester, orthophthalic unsaturated polyester, and combinations thereof.

38. The process of claim 32, wherein the material is a composite material comprised of the substrate material and an inclusion material.

39. The process of claim 38, wherein the inclusion material is selected from the group consisting of structural fibres, transmissive fibres, sensing materials, magnetic materials, non-magnetic materials, shielding materials, bulking agent, colorants, and combinations thereof.

40. The process of claim 38, wherein the inclusion material is introduced by a method selected from the group consisting of co-extrusion, wrapping, coating, mixing, precipitating, and combinations thereof.

41. The process of claim 32, wherein the deposition means is operable to release the material at variable but controlled flow rates and filament dimensions.

42. The process of claim 32, further wherein a computer-aided design computing system provides instructions to the control systems.

43. The process of claim 42, wherein the instructions are responsive to feedback from the sensing means.

44. The process of claim 32, including enabling a plurality of different angles for the deposition means to lay material by passing a first positioning means to a second articulable positioning means, the stage being disengaged from the first articulable positioning means and subsequently engaged with the second positioning means during operation or between operations.

45. The process of claim 44, wherein the stage is successively passed to one or more additional positioning means during operation.

46. The process of claim 32, wherein an object supported on a first stage is successively passed to one or more additional stages for enabling a plurality of different angles for the deposition means to lay material.

47. The process of claim 32, wherein a separate energy source is provided for permitting the continuous release of material by the deposition means during disengagement from the articulable positioning means during or between operations.

48. The process of claim 47, wherein the energy source is a battery, heat sink, spring, EM target for IR radiation, EM inductive or mechanical generative means.

49. The process of claim 32, wherein a chamber in the deposition means is provided for accommodating the short-term buffer storage for material for permitting the continuous release of the material by the deposition means during disengagement from the articulable positioning means during or between operations.

50. The process of claim 32, wherein the deposition means coupled to a first articulable positioning means is successively passed to a subsequent articulable positioning means, the deposition means being disengaged from the first positioning means and subsequently engaged with positioning means during operation or between operations of laying material, for enabling weaving, braiding or interweaving of laid down material when in strands by removing topological constraints imposed by the deposition means when coupled to an articulable positioning means.

51. The process of claim 32, wherein sensing means are provided selected from the group consisting of optical, sonic, ultrasonic, RF interference, alternate location awareness or sensing technologies, and combinations thereof.

52. The process of claim 32, wherein the articulable positioning means for the stage comprises one or more articulated arms, the one or more articulated arms including a rotational joint operative for rotating the object during filament winding operations.

53. The process of claim 52, wherein the one or more articulated arms are adapted to have up to five degrees of freedom.

54. The process of claim 53, wherein the one or more articulated arms further comprise actuator means for acceleration and changing direction.

55. The process of claim 32, wherein the articulable positioning means for the deposition means comprises one or more articulated arms, the one or more articulated arms adapted to have up to nine degrees of freedom.

56. The process of claim 55, wherein the one or more articulated arms further comprise actuator means located along the length of the one or more articulated arms.

57. The process of claim 56, wherein the one or more articulated arms further comprise actuator means located proximate to the deposition means, operable for providing multiple directions of manipulation to provide control of material placement.

58. The process of claim 32, wherein a first software program is provided for inputting properties of the material and initial defined load parameters to produce a model of material deposition for the object.

59. The process of claim 58, wherein a second software program is provided for determining whether the deposition of the material in accord with the model provided from the first software program is compatible with the physical capabilities of the articulable positioning means and deposition means wherein if the second software program determines that the placement of the material is compatible, then the material deposition model is translated into instructions to control the articulable positioning means and deposition means and placement of the material used to produce the object wherein if the second software program determines that the placement of the material is not compatible, then the second software program will instruct the first program to seek a model using a lowered optimization target, and to reiterate the functions of the first software program to provide a new, sub-optimized material deposition model.

60. An apparatus for making a three-dimensional object, comprising:

a. a stage for supporting the object during operation, on which the object is made, to which the object may be attached or grasped during operation;
b. articulable positioning means adapted for engagement with the stage, the positioning means operative for holding and manipulating the location and orientation of the stage and object thereon in three-dimensional space during manufacture of the object;
c. deposition means having at one end a discharge outlet operative for releasing and laying material for forming the object onto the stage or onto the object during the accretive manufacture of the object;
d. a material source containing material used to form the object, the material source in fluid flow communication with the deposition means at another end of the deposition means remote from the discharge outlet;
e. articulable positioning means adapted for engagement with the deposition means, the positioning means operative for holding and manipulating the deposition means in three-dimensional space for controlling where the material is laid;
f. sensing means for sensing the location and orientation of one or more of the stage, the articulable positioning means for the stage, the object surfaces, the deposition means, the articulable positioning means for the deposition means, and the material laid, measured in real time; and
g. control systems for controlling one or more of:
   i. location and orientation of the stage, and then the object surfaces during operation;
   ii. location and orientation of the articulable positioning means for the stage and the articulable positioning means for the deposition means; and
   iii. location and orientation of the deposition means and the material laid by the deposition means during operation, including the discharge of material by the deposition means and any subsequent change in the material laid by the deposition means; and
h. a first software program operable for inputting properties of the material and initial defined load parameters, to provide a model of material deposition for accretive manufacturing.

61. The apparatus of claim 60, further comprising a second software program operable for determining whether the model for the deposition of the material provided from the first software program is compatible with the physical capabilities of the articulable positioning means and the deposition means.

62. The apparatus of claim 61, wherein if the second software program determines that the placement of the material is compatible, then the material placement is translated into instructions used to control the articulable positioning means and the deposition means and placement of the material to produce the object wherein if the second software program determines that the placement of the material is not compatible, then the second software program will instruct the first software program to seek a model with a lowered optimization target and reiterate the process of the first software program to provide a new sub-optimal material deposition model.

\* \* \* \* \*